US005257105A

United States Patent [19]

Tanaka et al.

[11] Patent Number: 5,257,105

[45] Date of Patent: Oct. 26, 1993

[54] DISPLAY DRIVING METHOD AND APPARATUS WITH NOISE SIGNAL PROCESSING

[75] Inventors: Masaru Tanaka; Masanobu Okano; Katsuya Mizukata, all of Tenri; Makoto Takeda, Nara, all of Japan

[73] Assignee: Sharp Kabushiki Kaishi, Osaka, Japan

[21] Appl. No.: 983,293

[22] Filed: Nov. 30, 1992

Related U.S. Application Data

[63] Continuation of Ser. No. 589,649, Sep. 28, 1990, abandoned.

[30] Foreign Application Priority Data

Sep. 29, 1989 [JP] Japan ........................ 1-256289

[51] Int. Cl.[5] ........................ A04N 5/262

[52] U.S. Cl. ........................ 358/167; 358/183; 358/336; 360/38.1

[58] Field of Search ........................ 358/172, 167, 183, 36, 358/336, 163, 327, 22 PIP; 360/38.1

[56] References Cited

U.S. PATENT DOCUMENTS 3,674,931 7/1972 Fazio et al. ........................ 358/172
4,470,065 9/1984 Reitmeier ........................ 358/327
4,716,565 12/1987 Suma ........................ 358/327
4,777,531 10/1988 Hakamada et al. ........................ 358/183
4,875,106 10/1989 Heitman ........................ 358/336
4,905,077 2/1990 Ishii ........................ 358/22 PIP
5,029,340 7/1991 Hashimoto et al. ........................ 358/172
5,038,229 8/1991 Mester ........................ 360/38.1
5,109,279 4/1992 Ando ........................ 358/183
5,111,311 5/1992 Yamamoto ........................ 358/163
5,136,435 8/1992 Miyahara ........................ 358/183

OTHER PUBLICATIONS

Patent Abstracts of Japan, vol. 13, No. 413 (E-820) [3761], Sep. 12, 1989; and JP-A-1 151 888 (Victor Co. of Japan Ltd) Jun. 14, 1989.

Patent Abstracts of Japan, vol. 7, No. 80 (E-168) [1225], 2nd Apr. 1983; and JP-A-58 7986 (Zeneraru K.K.) Jan. 17, 1983.

*Primary Examiner*—John K. Peng
*Assistant Examiner*—Jeffrey S. Murrell
*Attorney, Agent, or Firm*—Nixon & Vanderhye

[57] ABSTRACT

An improved flat display apparatus such as a liquid crystal display apparatus is disclosed. The apparatus is constructed so that when video signals from a VTR is reproduced to be displayed, the switching noise portion included in the video signals is changed to black level before being displayed, the section within the picture image area in which the switching noise originally appeared is masked by black level, making it possible to conceal the disorder in the picture image. In the case where television video signals are to be displayed, the picture can be enjoyed on a wide picture image area because the mask of black level is not generated.

21 Claims, 3 Drawing Sheets

LCD
CONTROL
VIDEO I/F
OUT
BACK LIGHT
HSY,VSY
IN1
IN2
VSW
MIXER
MIXER
SI
SI
Sc2
Sc1
TV SIGNAL PROCESS
SUPERIMPOSE SIGNAL GENERATION
SYSTEM SWITCHING SIGNAL
VTR CONNECTION JUDGE
TV
VTR
13
14
15
16
17
18
19
20
21
22
23
24
25
26
27
28
29

DISPLAY DRIVING METHOD AND APPARATUS WITH NOISE SIGNAL PROCESSING

This is a continuation of application Ser. No. 07/589,649, filed Sep. 28, 1990, now abandoned.

BACKGROUND OF THE INVENTION

1. Field of the Invention

This invention relates to a display apparatus, and more particularly to a display apparatus for displaying images based on video signals received at least from an image reproducing apparatus such as a video tape recorder (VTR).

2. Description of the Prior Art

FIG. 3 shows a liquid crystal display (LCD) panel of an active matrix type LCD apparatus, which is a typical example of a display apparatus. On one side of a first glass substrate 1A, a number of gate bus lines and source bus lines (not shown) are formed in such a manner that they cross one another at right angles. Picture element electrodes 2 which are made of a transparent conductive material, and thin film transistors (TFTS) 3 are formed at each of the crossings of the gate and source bus lines to form a matrix arrangement. The gate and source of each TFT 3 are connected to the corresponding gate bus line and corresponding source bus line, respectively, and the drain is connected to the adjacent picture element electrode 2. The top of the formative surface of the picture element electrodes 2 and TFTs 3 is coated with a transparent protective film 4 and an orientation film 5A.

A second glass substrate 1B is disposed opposite the first glass substrate 1A. On the one side of this glass substrate 1B which faces the glass substrate 1A, a black matrix 6 is formed for shielding from light the areas other than the picture element electrodes 2 of the glass substrate 1A. Red, green and blue color filters 7 are formed correspondingly to the picture element electrodes 2 on the black matrix 6. A common electrode 8 which is made of a transparent conductive material is formed over the entire surface of the color filters 7, and is covered by an orientation film 5B.

Between the orientation film 5A and the orientation film 5B, a liquid crystal layer 9 is disposed. Polarization plates 10A and 10B are arranged respectively on the one side of the first glass substrate 1A opposite to the formative surface of the picture element electrodes 2, etc., and on the one side of the second glass substrate 1B opposite to the formative surface of the color filter 7, etc.

In the LCD apparatus comprising the above-described LCD panel, a scanning voltage (the voltage signal which designates in sequence each horizontal row of the picture element electrodes 2) is sequentially applied to the gate bus lines to turn on the TFTs 3 connected to the applied gate bus line. Drive voltages corresponding respectively to the display data for the scanned horizontal row of the picture elements are supplied from the source bus lines to be applied to the horizontal row of the picture element electrodes 2 through the turned-on TFTs 3.

When the drive voltage is applied to one of the picture element electrodes 2 through the corresponding TFT 3, the drive voltage is selectively applied to the part of the liquid crystal layer 9 (this part constitutes one picture element) which is sandwiched between the driven picture element electrode 2 and the common electrode 8, causing the optical characteristics of the part to change. When this change in the optical characteristics occurs, light is transmitted through only the driven picture element (the normally black system), or light is transmitted through only the picture elements which are not driven (the normally white system), depending upon the combination of the angles of the polarization axis of the polarization plates 10A and 10B. In the normally black system, light is transmitted through driven picture elements so that color display is performed for the color tones of color filters 7 each corresponding to those picture elements, while light is not transmitted through the picture elements when they are not driven and those picture elements display black. In the case of the normally white system, it is the opposite of this.

In a display apparatus using a cathode-ray tube, the level of the beam current varies depending upon input signal levels, thereby causing the overall size of the displaying area in the vertical direction to be changed. In an extreme case, the vertical retrace line appears on the screen. In such a display apparatus, therefore, the size of the displaying area is set to be slightly greater than the screen.

In an LCD apparatus comprising the abovedescribed structure, on the other hand, the display is not affected by input signal levels (in other words, the size of the displaying area is fixed depending upon the logic of the display operation). Usually, therefore, the displaying area of an LCD apparatus is greater than that of a display apparatus using a cathode-ray tube.

Generally, a VTR has a plurality of reproducing heads, use of the heads being switched with the period of one vertical interval. The changeover of the reproducing heads requires some period of time. When video signals are reproduced in such a VTR, therefore, switching noises appear in the portion of reproduced video signals which corresponds to the vertical interval. When displaying images obtained from video signals from a VTR on an LCD apparatus, switching noises appear in the top and bottom portions of the displaying area, which is greater than that of a cathode-ray tube, causing a disturbance of the picture image.

Accordingly, in a prior LCD apparatus, masks are formed to cover the picture elements where switching noises appear. More specifically, as shown in FIG. 3, a black stripe 6A is formed at the region which corresponds to the picture elements where the switching noise appears, whereby light is prevented from transmitting through this region. FIG. 4 illustrates an LCD panel in which this kind of masking is provided. In this apparatus, picture elements 12 of the uppermost one row and lowermost five rows are masked by the black stripes 6A.

When such an LCD apparatus receives video signals from a video signal outputting apparatus of another type such as a television receiver, the black stripes 6A remain masking the uppermost and lowermost portions of the picture elements 12 so that a portion of the display area does not contribute to the display. This results in that it becomes impossible to make the most of the advantages of an LCD apparatus in achieving a larger displaying area as compared with a cathode-ray tube.

SUMMARY OF THE INVENTION

The display apparatus of this invention, which overcomes the above-discussed and numerous other disadvantages and deficiencies of the prior art, comprises signal receiving means for receiving video signals from at least an image reproducing apparatus, and display means for displaying images based on said received video signals, and further comprises signal process means for replacing a predetermined portion of said video signals with a predetermined kind of signal.

In another aspect, the display apparatus of this invention comprises signal receiving means for receiving video signals from at least an image reproducing apparatus, and display means for displaying images based on said received video signals, and further comprises drive means for making a predetermined portion of said display means.

In an embodiment, the predetermined kind of signal is a black level signal.

In an embodiment, the predetermined portion is that wherein switching noises exist.

In an embodiment, the predetermined portion includes at least first one horizontal scanning line.

In an embodiment, the predetermined portion includes at least last five horizontal scanning lines.

In an embodiment, the apparatus further receives video signals from a television receiver.

In an embodiment, the apparatus further comprises judging means for judging whether said apparatus is receiving video signals from an image reproducing apparatus or not.

In an embodiment, the image reproducing apparatus is a video tape recorder.

Thus, the invention described herein makes possible the objectives of:

(1) providing a display apparatus which can electrically mask the portion of the display area where switching noises appear;

(2) providing a display apparatus which can electrically mask the portion of the display area where switching noises appear, only when a video signal from a VTR is played back and displayed; and (3) providing a display apparatus which has a large display area.

According to the invention, when video signals from an image reproducing apparatus such as a VTR are received, a portion of the received video signals wherein switching noises may exist is replaced with a predetermined kind of signal such as the black level signal. Therefore, the part of the displaying area of the display apparatus which corresponds to the portion is masked so as not to contribute to the display, thereby eliminating the effect of the switching noises. On the other hand, when receiving video signals having no switching signal, the masking is not performed, resulting in that the overall size of the displaying area can be used for displaying.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
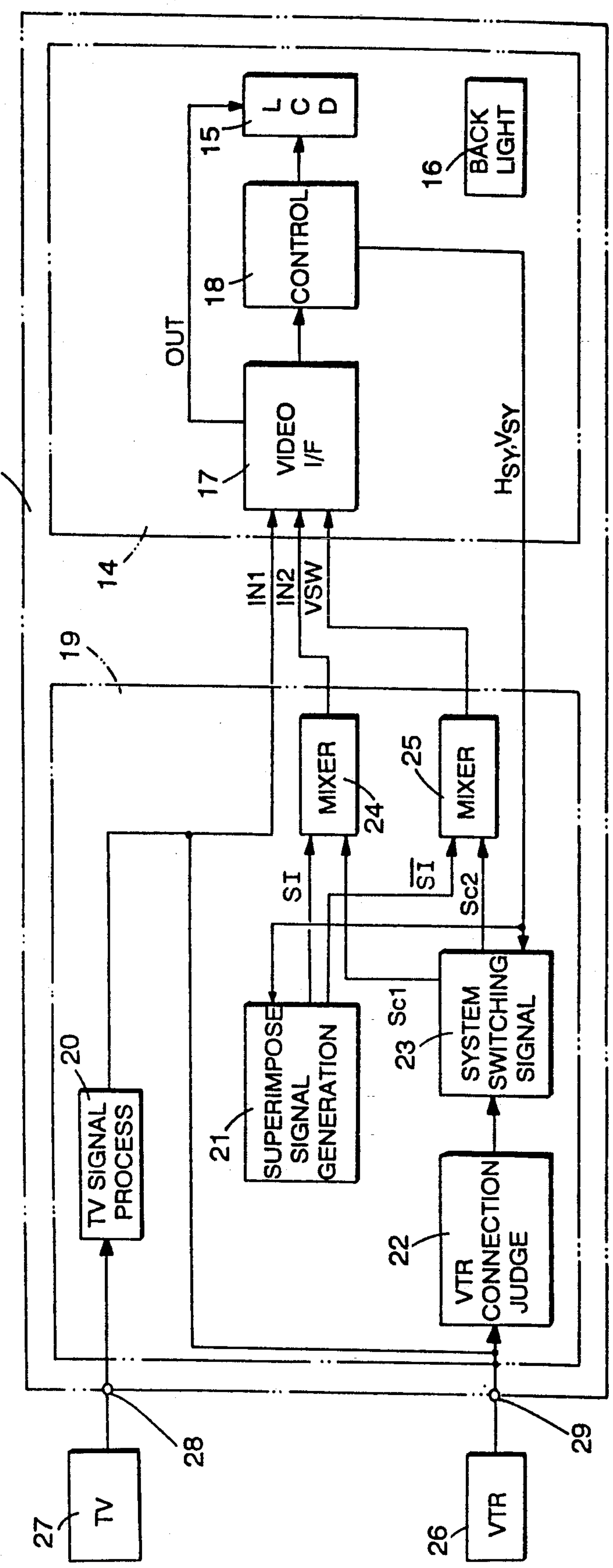
FIG. 1 is a block diagram showing an LCD apparatus according to the invention

FIG. 1 illustrates an LCD apparatus according to the invention. The display apparatus 13 of FIG. 1 comprises an LCD module 14 which is of the active matrix type, and a signal processor 19. The display apparatus 13 is provided with the superimposing function for mixedly displaying characters or the like.

Figure 3:
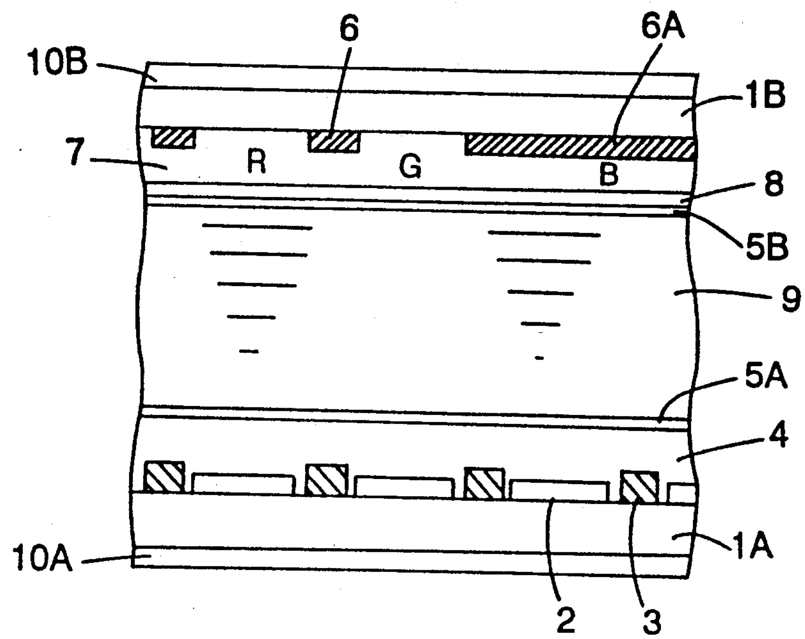
FIG. 3 is a sectional view of an LCD panel used in a conventional LCD apparatus.
Figure 4:
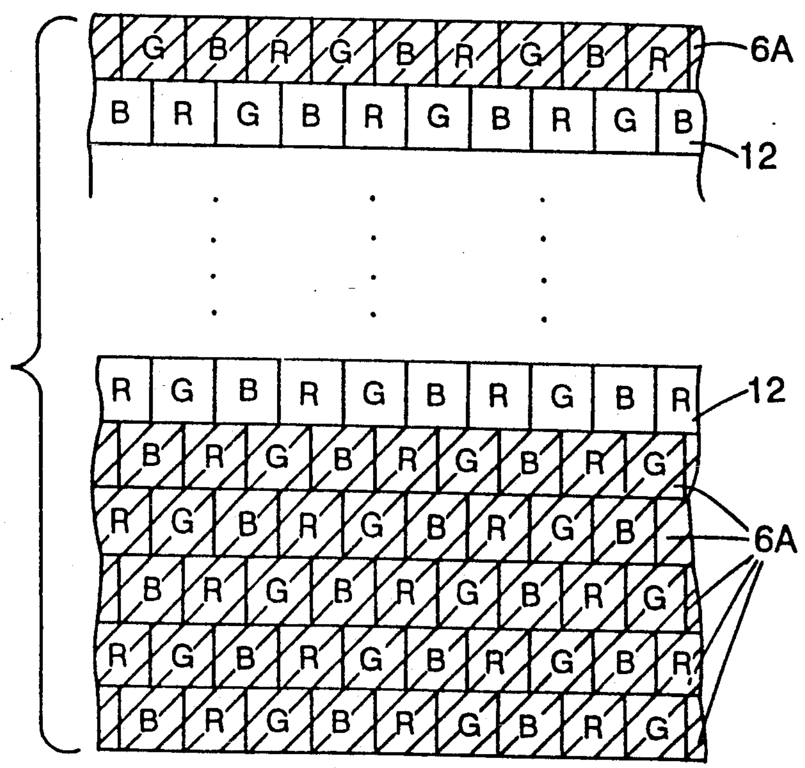
FIG. 4 is a plan view of the LCD panel of FIG. 3.

The LCD module 14 comprises an LCD panel 15, a back light device 16 which is a light source arranged behind the LCD panel 15, a video interface circuit 17 which inverts and amplifies video signals IN1 and IN2 supplied from the signal processor 19 and supplies them to the LCD panel 15, and a control circuit 18 which controls the drive for the LCD panel 15 based upon the output of the video interface circuit 17. The LCD panel 15 has a similar structure as the LCD panel shown in FIG. 3 except that the black stripe 6A is not formed, and therefore its detailed description is omitted.

The signal processor 19 comprises a TV signal processing circuit 20, a superimpose signal generation circuit 21, a VTR connection judging circuit 22, a system switching signal generation circuit 23, and first and second mixers 24 and 25.

The TV signal processing circuit 20 processes television video signals which are supplied from a television receiver 27 through a TV input terminal 28. The superimpose signal generation circuit 21 generates a digital signal SI for characters, graphics, etc., which are to be superimposed on video signals supplied from the television receiver 27 or a VTR 26 to be mixedly displayed on the LCD panel 15. The signal SI is supplied to the first mixer 24. The superimpose signal generation circuit 21 also generates another signal /SI which is obtained by inverting the signal SI.

The VTR connection judging circuit 22 judges whether or not the VTR 26 is connected to a VTR input terminal 29, and its output is coupled to the system switching signal generation circuit 23. Both television video signals which are processed in the TV signal processing circuit 20, and VTR video signals which are is input through the VTR input terminal 29 are supplied to the video interface circuit 17 as the first video signal input IN1. The video signals output through the mixer 24 from the superimpose signal generation circuit 21 are supplied to the video interface circuit 17 as the second video signal input IN2.

The system switching signal generation circuit 23 receives the internal horizontal synchronizing signal $H_{SY}$ and the internal vertical synchronizing signal $V_{SY}$ from the control circuit 18, and produces two kinds of outputs SC1 and SC2 for selectively switching and displaying on the LCD panel 15, the first video signal input IN1 and second video signal input IN2 which are supplied to the video interface circuit 17, in synchronization with the synchronizing signals $H_{SY}$ and $V_{SY}$. The first mixer 24 receives the signal SI from the circuit 21 and the output SC1 from circuit 23, and the second mixer 25 receives the signal /SI from the circuit 21 and the output SC2 from circuit 23. The output of the first mixer 24 is supplied to the video interface circuit 17 as the second input IN2, while the output of the second mixer 25 is supplied to the video interface circuit 17 as the system switching signal VSW.

Figure 2:
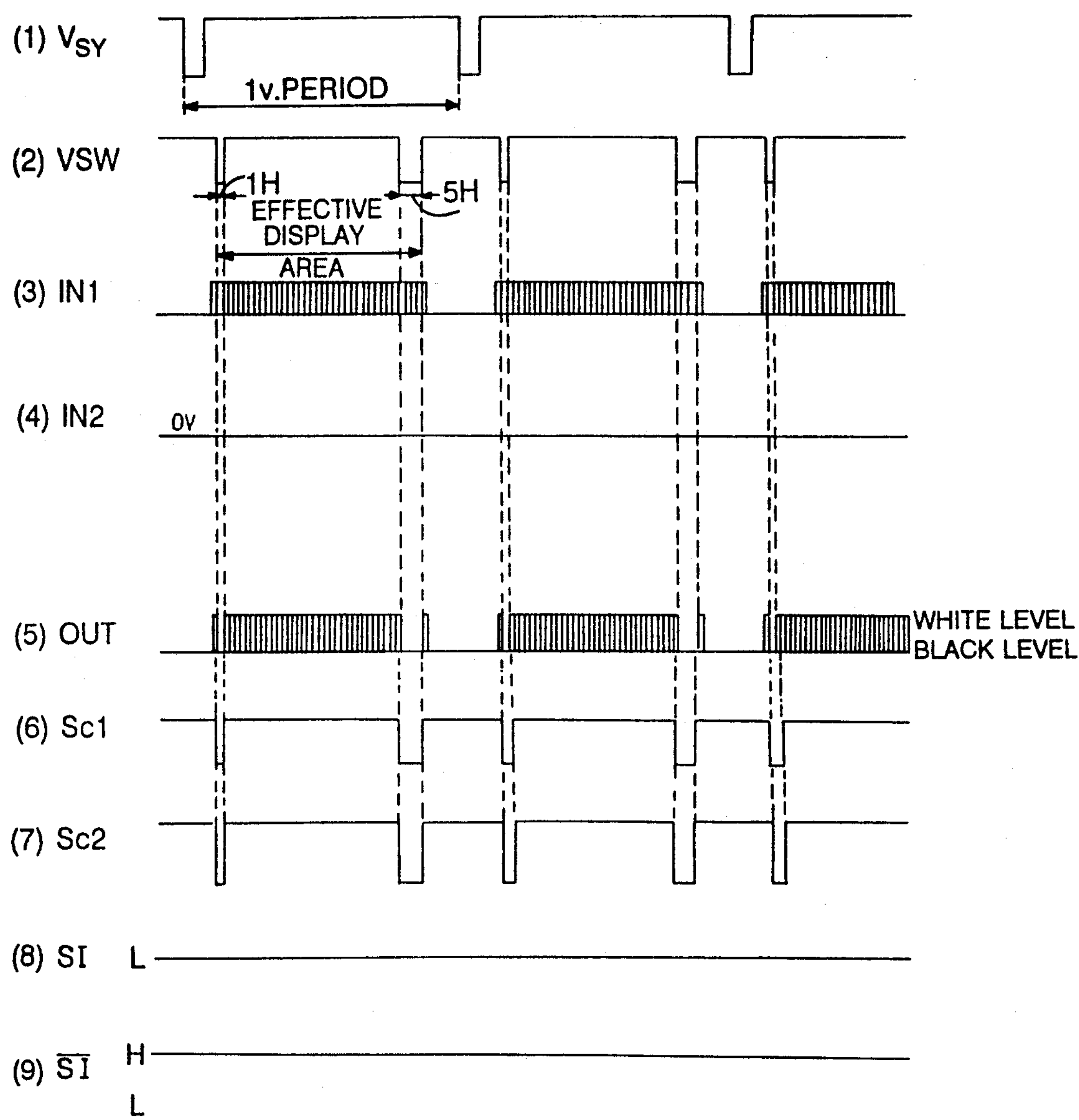
FIG. 2 illustrates waveforms of signals appearing in the LCD display apparatus used in the apparatus of FIG. 1.

With reference to FIG. 2, the operation of the LCD display apparatus 13 will be described. When the VTR 26 is connected to the VTR input terminal 29, the VTR connection judging circuit 22 detects this connection. The video signal from the VTR 26 is sent to the video interface circuit 17 as the first video signal input IN1. When judging circuit 22 detects the connection of the VTR 26, the system switching signal generation circuit 23 is controlled so that the first output SC1 is as shown in (6) of FIG. 2, and that no signal for superimposing characters or the like is output from the superimpose signal generation circuit 21 (namely, the digital output signal SI of the circuit 21 is always low as shown in (8) of FIG. 2). Therefore, the second video signal input IN2 is kept to be 0 volt, which is equivalent to black level, for one entire vertical period ((4) of FIG. 2).

On the other hand, the second output SC2 of the system switching signal generation circuit 23 is low during the scanning period of the picture elements of the first row and the scanning period of the picture elements of the lowest five rows of the liquid crystal panel 15, and high during other periods ((7) of FIG. 2). Hence, the system switching signal VSW output from the second mixer 25 to which the second output SC2 and the inverted output signal /SI of the circuit 21 are supplied is low (0 volt) during the scanning period of the picture elements of the first row (corresponding one horizontal scanning period) and the scanning period of the picture elements of the lowest five rows (corresponding five horizontal scanning periods), and high (5 volts) during other periods as shown in (2) of FIG. 2.

In the video interface circuit 17, when the system switching signal VSW is high, the first video signal input IN1 is selected to be output, and when the system switching signal VSW is low, the second input IN2 is selected to be output. Therefore, during the scanning period of the picture elements of the first row and the scanning period of the picture elements of the lowest five rows, the output OUT of the video interface circuit 17 is the second video signal input IN2 which is equivalent to the black level signal, while during other periods the output OUT is the first input IN1 which is the video signal from the VTR 26.

Accordingly, the image originating in the video signal from the VTR 26 is displayed on the LCD panel 15, but the display area of the picture elements of the uppermost one row and the display area of the picture elements of the lowermost five rows are displayed in black. Since switching noises included in the video signal from the VTR 26 occur at the timing corresponding to the masked area which is displayed in black, switching noises are concealed by the masking of the black display, and hence it is possible to eliminate the disturbance in the picture image caused by switching noises.

When characters or the like (e.g., a channel call) are to be superimposed, the levels of the outputs SI and /SI of the superimpose signal generation circuit 21 are controlled so as to be periodically low and high in accordance with the image data of the images to be superimposed, thereby enabling to mix and display the images on the LCD panel 15 together with the masking. According to this embodiment, however, the superimposed images are displayed as black level. If the superimposed images are to be displayed in another color, it is necessary to add an adequate circuit such as a muting circuit.

In the case where the VTR 26 is not connected to the VTR input terminal 29 and television video signals are input from the TV input terminal 28, the VTR connection judging circuit 22 detects this no-connection state, and the second output SC2 of the system switching signal generation circuit 23 is controlled so as to remain high, whereby the system switching signal VSW is kept high. Consequently, the masking by the black display is not performed, and the entire display area of the LCD panel 15 can be used effectively for picture image display.

In the above, an apparatus having two input systems to the video interface circuit 17 is described. In the case where there is only one system which inputs video signals, a signal corresponding to the mask of the black display may be mixed in the video signals, using the internal horizontal synchronizing signal $H_{SY}$ and the internal vertical synchronizing signal $V_{SY}$ which are supplied from the control circuit 18.

When a signal indicating that video signals are currently reproduced in the VTR 26 is sent from the VTR 26, it is possible to omit the VTR connection judging circuit 22. Such a signal can be obtained from an adequate relay circuit which is interlocked with the replay button of the VTR 26.

The VTR connection judging circuit 22 may be a switch circuit which is provided adjacent to the VTR input terminal 29 and actuated by the connection of the VTR 26. Alternatively, the VTR connection judging circuit 22 may be a changeover switch which is manually operated.

An active matrix type LCD display apparatus is described in the above, but this invention is not being limited to this, and it is apparent for those skilled in the art that this invention also applicable to an LCD display apparatus of another type, and still further to another kind of display apparatus such as an EL display apparatus.

According to the invention, since it is constructed so that when video signals from a VTR is reproduced to be displayed, the switching noise portion included in the video signals is changed to black level before being displayed, the section within the picture image area in which the switching noise originally appeared is masked by black level, making it possible to conceal the disorder in the picture image. On the other hand, in the case where television video signals are to be displayed, the picture can be enjoyed on a wide picture image area because the mask of black level is not generated.

In another embodiment of the invention, the control circuit 18 controls the portion of the picture elements where switching noises appear, so as not to be driven. This embodiment can achieve the same effect as the above-described embodiments.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

We claim:

1. A display apparatus comprising:

signal processing means for processing video signals from at least an image reproducing apparatus;

display means for displaying images based on said processed video signals;

wherein said signal processing means comprises judging means for judging whether said signal processing means is receiving video signals from said image reproducing apparatus or TV signals; and, wherein said display means comprises signal replacing means for replacing a predetermined portion of said video signals with a signal having a predetermined level, in response to a signal received from said judging means.

2. A display apparatus comprising:

signal processing means for processing video signals from at least an image reproducing apparatus;

display means for displaying images based on said processed video signals;

superimpose signal generator for generating a signal having a predetermined level and;

wherein said signal processing means comprises judging means for judging whether said signal processing means is receiving video signals from said image reproducing apparatus or TV signals; said display means comprises signal replacing means for replacing at least a predetermined portion of said video signals with said predetermined level of signal, in response to a signal received from said judging means which has judged said video signals to be that from image reproducing apparatus, and said predetermined level of signal is a black level signal for display on said display means.

3. A display apparatus according to claim 1, wherein said predetermined portion is that wherein switching noises exist.

4. A display apparatus according to claim 1, wherein said predetermined portion includes at least a first one horizontal scanning line.

5. A display apparatus according to claim 1, wherein said predetermined portion includes at least a last one horizontal scanning line.

6. A display apparatus according to claim 1, wherein said apparatus further receives video signals from a television receiver.

7. A display apparatus according to claim 1, wherein said image reproducing apparatus is a video tape recorder.

8. A display apparatus comprising:

signal processing means for processing video signals from at least an image reproducing apparatus;

display means for displaying images based on said processed video signals comprising control means for controlling the display image and transferring internal synchronizing a signals to said signal processing means;

said signal processing means comprising drive means for generating a predetermined portion of video signals to be displayed on said display means, said drive means comprising:

a superimpose signal generator for generating first two different signals, each with a predetermined signal level;

system switching signal generating means for generating second two different signals for use in replacing said predetermined portion of said video signals by a signal corresponding to one of said first two different signals; and mixers for mixing first signals from said superimpose signal generator and said system switching signal generating means and for mixing second signals from said superimpose signal generator and said system switching signal generating means;

said system switching signal generating means generating the first signals and the second signals in accordance with signals from said display means.

9. A display apparatus according to claim 8, wherein said predetermined portion replaces a portion of said received video signals in which switching noises exist.

10. A display apparatus according to claim 8, wherein said predetermined portion includes at least first one horizontal scanning line.

11. A display apparatus according to claim 8, wherein said predetermined portion includes at least a last one horizontal scanning line.

12. A display apparatus according to claim 8, wherein said apparatus further receives video signals from a television receiver.

13. A display apparatus according to claim 12, wherein said display apparatus further comprises judging means for judging whether said display apparatus is receiving video signals from an image reproducing apparatus.

14. A display apparatus according to claim 8, wherein said image reproducing apparatus is a video tape recorder.

15. A video display system comprising:

a display device having activatable display elements arranged in a plurality of display lines, each display line having a line number and being activatable during a line scan period;

video interface and control means for supplying a video output signal to the display device and for controlling the display device whereby selected display elements are activated in accordance with the video output signal, the video interface and control means receiving a system switching signal whereby the video interface and control means determines which of a selected one of a first video input signal and a second video input signal is to be applied to the display device in a line scan manner as the video output signal, the video interface and control means generating a synchronization signal indicative at least of a line number of display elements for activation;

means for generating a predetermined signal as the second video input signal;

device determining means for determining from which of a plurality of external devices the first video input signal originates and for producing a signal in accordance therewith;

means for using the synchronization signal from said control means and the signal produced by the device determining means for generating the system switching signal, whereby the second video input signal is applied to the display device as the video output signal during a predetermined line scan period corresponding to a time at which the first video input signal is likely to include noise.

16. The apparatus of claim 15, wherein the second video input signal is a black level signal for displaying on a displaying means.

17. The apparatus of claim 16, wherein a first one of the external devices is a television receiver and a second one of the external devices is a video tape player, and wherein the second video input signal is applied to the display device as the video output signal for at least a line scan period corresponding to a line having the lowest line number and for at least a line scan period corresponding to line having the greatest line number.

18. The apparatus of claim 15, wherein a first of the external devices is a television receiver and a second of the external devices is a video tape player.

19. A video display method for driving a display device having activatable display elements arranged in a plurality of display lines, each display line having a line number and being activatable during a line scan period, the method comprising:

(1) determining from which of a plurality of external devices a first video input signal originates and for producing a signal in accordance therewith;

(2) generating a predetermined signal as a second video input signal;

(3) determining which of a selected one of the first video input signal and the second video input signal is to be applied to the display device as a video output signal and producing a signal indicative thereof;

(4) supplying the video output signal of step (3) to the display device and controlling the display device in line scan manner whereby selected display elements are activated in accordance with the indicative signal;

(5) generating a synchronization signal indicative of at least a line number of display elements for activation;

(6) using the synchronization signal of step (5) and the signal of step (3) for generating a system switching signal, (7) using the system switching signal to step (6) in the determination of step (3) whereby the second video input signal is applied to the display device as the video output signal during a predetermined line scan period corresponding to a time at which the first video input signal is likely to include noise.

20. The method of claim 19, wherein the second video input signal is a black level signal.

21. The method of claim 19, wherein the second video input signal is applied to the display device as the video output signal for a line scan period corresponding to a line having the lowest line number and for line scan periods corresponding to lines having the five greatest line numbers.

* * * * *